United States Patent [19]

Edwards et al.

[11] Patent Number: 5,179,797
[45] Date of Patent: Jan. 19, 1993

[54] NIGHT FISHING LIGHT

[76] Inventors: John J. Edwards, P.O. Box 434, Sylvan Beach, N.Y. 13157; Billy J. Lohr, R.D. 1 Box 183, Higginsville Rd., Durhamville, N.Y. 13054

[21] Appl. No.: 797,997

[22] Filed: Nov. 26, 1991

[51] Int. Cl.⁵ ............................................. A01K 75/02
[52] U.S. Cl. .......................................... 43/17.5; 43/25; 362/191
[58] Field of Search ............... 43/25, 17.1; 362/109, 362/191, 198

[56] References Cited

U.S. PATENT DOCUMENTS

| | | |
|---|---|---|
| 1,190,872 | 7/1916 | Dildime . |
| 1,369,644 | 2/1921 | Forster ................ 362/198 |
| 1,532,493 | 4/1925 | Ivie ...................... 362/109 |
| 1,752,397 | 4/1930 | See ...................... 362/191 |
| 2,071,557 | 2/1937 | Miyaoka ............... 362/198 |
| 3,017,499 | 1/1962 | Fore . |
| 3,735,119 | 5/1973 | Williams ............... 362/198 |
| 3,740,887 | 6/1973 | VanLeeuwen . |
| 4,026,059 | 5/1977 | Ochs . |
| 4,117,618 | 10/1978 | Utsler . |
| 4,298,913 | 11/1981 | Lozar ................... 362/191 |
| 4,479,321 | 10/1984 | Welstead . |
| 4,697,375 | 10/1987 | Mills . |
| 4,823,496 | 4/1989 | Powell . |
| 4,970,631 | 11/1990 | Marshall ............... 362/191 |

FOREIGN PATENT DOCUMENTS 0173638  1/1922  United Kingdom ........... 362/191

Primary Examiner—Richard K. Seidel
Assistant Examiner—James Miner
Attorney, Agent, or Firm—Wall and Roehrig

[57] ABSTRACT

A night fishing tip light for a fishing rod has a battery holder and a pair of wires that extend to an LED. One pair of Velcro straps affixed to the battery holder back attach the holder to the rod handle and a second pair mate to hold the power cells in the holder. The LED and the wire conductors are mounted by cable ties onto the side of the rod away from the fishing line.

7 Claims, 1 Drawing Sheet

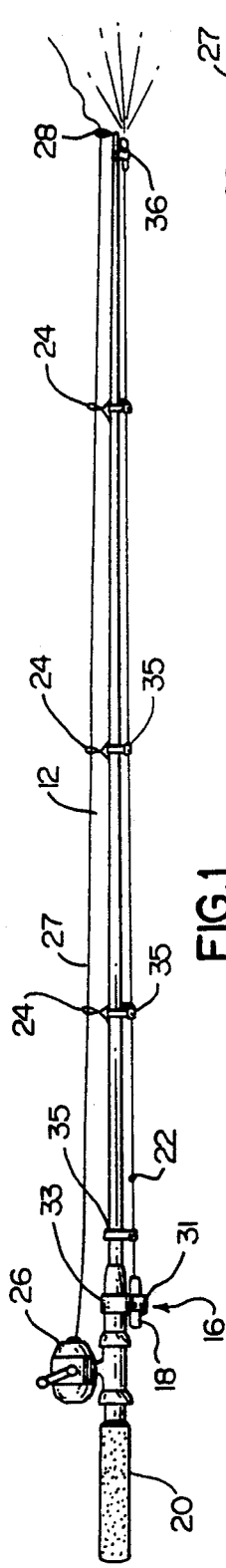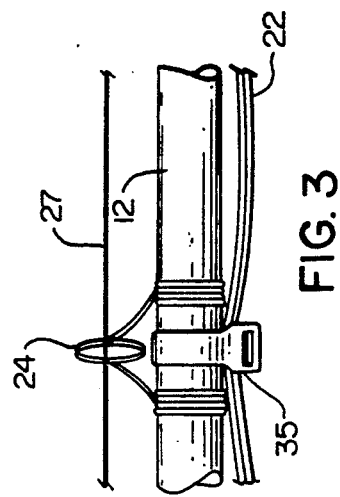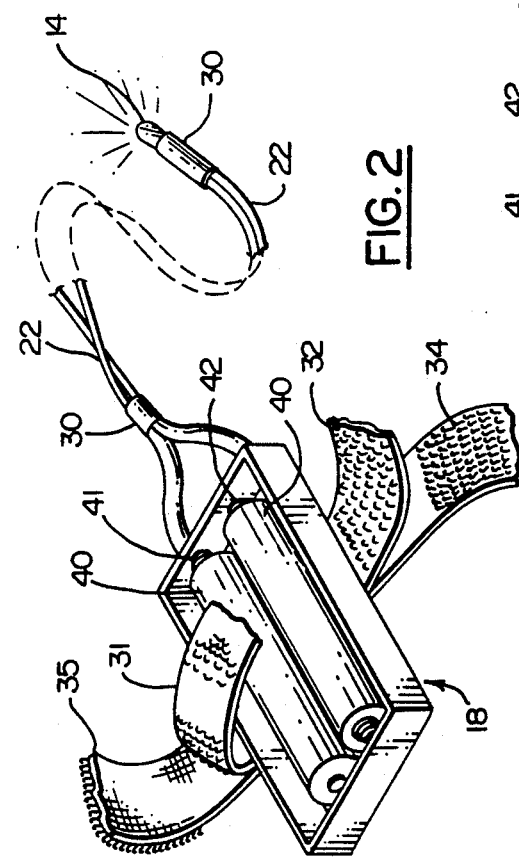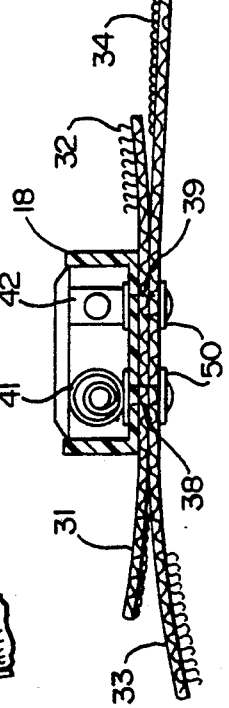

NIGHT FISHING LIGHT

BACKGROUND OF THE INVENTION

This invention relates to a rod tip light for a fishing rod, and is more particularly concerned with a simple, lightweight, and unobtrusive light unit which provides a visible indication of the rod tip position in darkness, but does not interfere with the action of the fishing rod.

When fishing at night, the fisherman has to keep the tip of the rod in view to detect whether a fish is taking the bait. The usual approach is to keep a lantern nearby; however, this can soon attract mosquitos and other biting insects, so a preferred approach is to illuminate the rod tip with low-level light. Several proposals to this end have been presented previously.

Welstead U.S. Pat. No. 4,479,321 describes a night signalling device where a battery housing mounted on the rod contains a battery, a lamp, and a gravity-actuated switch. Ochs U.S. Pat. No. 4,026,089, Fore U.S. Pat. No. 3,017,499, Utsler U.S. Pat. No. 4,117,618, and Mills U.S. Pat. No. 4,697,375 have tip or rod light systems where the lamp and wiring are contained within the rod, so the rod and handle must be specially constructed. Powell U.S. Pat. No. 4,823,496 describes a luminous clip that fits over the rod tip guide. This is not electrically powered. Van Leeuwen U.S. Pat. No. 3,740,887 describes a light unit that contains bulb and battery and replaces the original tip guide of a fishing rod.

None of these provides a simple, reliable and inexpensive device which can attach easily to an existing fishing rod without modification of the rod. Those that are self-contained are bulky devices that may also upset the balance and handling of the fishing rod.

OBJECTS AND SUMMARY OF THE INVENTION

It is a principal object to provide a fishing rod tip light that is simple and can be used with any fishing rod without modifying or altering the rod.

It is another object to provide the fishing rod tip with low level illumination and which any fisherman can easily install on any rod.

According to an aspect of this invention, a battery holder is attached, with Velcro straps or other simple means, to the handle of the fishing rod. An LED is attached, e.g. with a cable tie, to the tip-top or last eyelet. A wire pair that connects the battery holder to the LED is attached at intervals along the rod, preferably at places where the guides are attached to the rod. The assembly is mounted away from the line side of the rod and does not interfere with the action of the rod or with the retrieval of the bait or lure. Preferably, the LED is a 3-volt device, and does not require a current limiting resistor when powered by a pair of 1½ volt cells. The conductor wires are 24 gauge, insulated, and the battery holder is a two-cell unit holding two type AAA cells. The holder case is of the open type, and a pair of Velcro straps hold the two AAA cells in place, but permit them to be quickly removed when light is not needed.

The battery holder, being mounted on the rod handle opposite the reel, does not interfere with handling or balance or with retrieval. The wires and LED do not affect the play or balance of the rod. The cable ties fit into the mounts of the line guides without interfering with the fishing line. Except for the batteries, which are removable from the holder, all electrical connections are permanently made, e.g. by solder, and are protected with shrink tubing. There is no switch, and the device is actuated by installing the AAA batteries, and is deactivated by removing them.

The above and many other objects, features, and advantages of this invention will be more completely appreciated from the ensuing description of a preferred embodiment, to be read in connection with the accompanying Drawing.

BRIEF DESCRIPTION OF THE DRAWING

FIG. 1 is a side view of a fishing rod assembly which includes the rod tip light according to an embodiment of this invention.

FIG. 2 is a perspective view of the battery holder and LED of this embodiment, with a portion of the wires being omitted.

FIG. 3 is an elevation view showing a portion of the rod with a line guide on which the wires of this embodiment are attached.

FIG. 4 shows the LED end of the rod tip light attached onto the tip-top or tip guide.

FIG. 5 is a sectional view of the battery holder showing the attachment of the Velcro straps.

DETAILED DESCRIPTION OF THE PREFERRED EMBODIMENT

With reference to FIG. 1, a battery powered tip light 10 is shown installed on a fishing rod 12, with an LED 14 attached to the tip 16 of the rod and a battery holder 18 attached to the rod's handle 20, and a pair of wires 22 extending from the battery holder to the LED and attached to a number of intermediate positions along the rod, in this case at the line guides 24. A reel 26 is mounted on the handle 20, and fish line 27 extends out from the reel through the guides 24 and through a final guide or tip-top 28 at the rod tip 16.

As shown in FIG. 2 the battery holder 18 in this device is an open-sided, two-cell holder adapted to hold two AAA-size cells. The wires 22 are soldered to the terminals of or leads from the battery holder 18 and also to leads of the LED 14, and each end is covered with shrink tubing 30. The shrink tubing also covers the base of the LED 14.

The holder 18 has a first, short pair of Velcro straps 31, 32 which mate to hold in the two AAA cells, and a second pair of longer Velcro straps 33, 34, which hold the battery holder 18 to the rod handle 20. The wires 22 are held snugly to the rod 12 on the side away from the fishing line 27 by means of nylon cable ties 35. These are each positioned beneath an associated line guide 24, as shown in FIG. 3. The LED 14 is held to the tip-top 28 by means of a cable tie 36 as shown in FIG. 4.

As shown in FIG. 5, the Velcro straps 30, 32 and the associated Velcro straps 31, 33 are affixed to the battery holder 18 by a pair of rivets 38, 39 which pass through a bottom wall 40 of the holder 18. The rivets 38,39 hold the straps securely, but do not interfere with the placement of two power cells.

As shown in FIG. 5, and also in FIG. 2, the battery holder 18 is of an open type that is, with one open side 28 over which the Velcro straps 31 and 32 meet to retain a pair of AAA cells 40,40 which are disposed side by side. A spring contact 41 and a bar contact 42 are shown in FIG. 5 at one end of the holder 18. The Velcro strips 31 and 33 are affixed onto a back side 44 of the holder 18 by means of rivet 38 and the other Velcro strips 32 and 34 are affixed to the back side 33 by the other rivet 39. Washers 50 on these rivets reinforce the holding power of the rivets.

To install the tip light 10 the battery holder 18 is secured to the fishing rod handle 20 with the long Velcro straps 33, 34. The holder 18 is positioned so that it does not interfere with the operation of the reel 26 or with the line 27. With the wires 22 positioned along the rod 12 opposite the line 27 and opposite the line guides 24 or eyelets, the cable tie 36 is threaded through the tip-top 28 and around the base LED 14 where it is covered with the shrink tubing 30. The LED 14 should be positioned where it will not interfere with the fishing line 27. The position of the locks of the cable ties 35 and 36 should be down, i.e. away from the line 27 so as not to interfere with the line. In the case that there is an excess of the wire 22, the excess can be formed into a loop 52 near the handle 20 and secured beneath one of the cable ties 35. After the cable ties 35, 36 are in place, they should be re-checked to ensure that they are all snug. Then, using a nail clipper or scissors, excess of the cable tie tongues is cut off at the locks.

When the fisherman wants to engage in night fishing, he or she installs the two AAA cells and then secures them with the Velcro straps 31, 32. As there is no switch, when the fisherman stops fishing, he or she simply removes the two AAA cells and stores them in the tackle box. This ensures that the device is as simple as possible, with no moving parts that can break or corrode. The two AAA cells, being widely available, can be purchased virtually anywhere near the fishing site, so loss of the cells should not result in prolonged interruption of night fishing. Moreover, removal of the cells 50 from the holder 18 ensures that the cells will not leak and degrade or corrode while in the holder when the rod 12 and the tip light 10 will not be damaged during storage between fishing trips.

While the invention has been described with reference to a preferred embodiment, it should be recognized that the invention is not limited to that embodiment. Rather, many modifications and variations would present themselves to those of skill in the art without departing from the scope and spirit of this invention, as defined in the appended claims.

What is claimed is:

1. A night fishing tip light arrangement for a fishing rod of the type having a handle at a proximal end, a tip top eyelet at a distal end and a plurality of line guides disposed along the rod to carry fishing line along one side of the rod and having a reel mounted on said proximal end, said tip light arrangement comprising a battery holder having an open side through which one or more battery cells can be installed and a back opposite said open side, a first pair of straps which are affixed onto said battery holder back and which mate together over said open side to retain said one or more cells in said holder and a second pair of straps affixed onto said back and which mate together over said rod handle to removably mount the battery holder onto said handle; a pair of wire conductors affixed at one end onto electrical terminals or leads on said battery holder, and extending distally to said rod tip top eyelet; an LED having a pair of terminals affixed to the respective wire conductors at their distal ends; and cable tie means attaching said LED to said rod tip top eyelet and attaching said wire conductors to said rod, each cable tie means being positioned at a respective one of said line guides so that the wire conductors and said LED are disposed on an opposite side of said rod away from said one side.

2. The night fishing tip light arrangement of claim 1, provided without a switch such that said tip light is actuated to energize the LED by installing said one or more cells, and is de-actuated by removing said one or more cells.

3. The night fishing tip light arrangement of claim 1, wherein said battery holder is of the type that holds two AAA cells disposed side by side.

4. The night fishing tip light arrangement of claim 3 wherein said straps are Velcro straps.

5. The night fishing tip light arrangement of claim 4 wherein said straps are affixed by rivets onto said battery holder back in a fashion so as not to interfere with installation of said cells.

6. The night fishing tip light arrangement of claim 1 further comprising shrink tubing disposed over distal and proximal ends of said pair of wire conductors.

7. The night fishing tip light arrangement of claim 1 wherein said LED is a three-volt device, so that no protective resistor is employed.

* * * * *